(12) United States Patent
Schank (10) Patent No.: US 9,751,624 B2
(45) Date of Patent: Sep. 5, 2017

(54) INDIVIDUAL BLADE CONTROL UTILIZING PNEUMATIC MUSCLES

(71) Applicant: Bell Helicopter Textron Inc., Fort Worth, TX (US)

(72) Inventor: Troy Schank, Keller, TX (US)

(73) Assignee: BELL HELICOPTER TEXTRON INC., Fort Worth, TX (US)

(*) Notice: Subject to any disclaimer, the term of this patent is extended or adjusted under 35 U.S.C. 154(b) by 422 days.

(21) Appl. No.: 14/559,339

(22) Filed: Dec. 3, 2014

(65) Prior Publication Data

US 2016/0159475 A1    Jun. 9, 2016

(51) Int. Cl.
*B64C 27/64* (2006.01)
*B64C 27/72* (2006.01)
*B64C 27/57* (2006.01)

(52) U.S. Cl.
CPC .............. *B64C 27/64* (2013.01); *B64C 27/57* (2013.01); *B64C 27/72* (2013.01); *B64C 2027/7211* (2013.01); *B64C 2027/7216* (2013.01); *Y02T 50/34* (2013.01)

(58) Field of Classification Search
CPC ......... B64C 27/57; B64C 27/64; B64C 27/72; B64C 2027/7211; B64C 2027/7216
See application file for complete search history.

(56) References Cited

U.S. PATENT DOCUMENTS

| | | | | |
|---|---|---|---|---|
| 4,297,080 A * | 10/1981 | Krauss | ................... | B64C 27/33 416/114 |
| 7,064,472 B2 * | 6/2006 | Pelrine | ................. | A61M 5/142 310/324 |
| 7,931,240 B2 * | 4/2011 | Kothera | ................... | B63B 1/248 244/218 |
| 2008/0035798 A1 * | 2/2008 | Kothera | ................... | B63B 1/248 244/212 |
| 2008/0064921 A1 * | 3/2008 | Larkin | ............... | A61B 1/00087 600/104 |
| 2011/0071508 A1 * | 3/2011 | Duval | ................ | A61B 1/00087 606/1 |

(Continued)

FOREIGN PATENT DOCUMENTS

| | | |
|---|---|---|
| EP | 1262403 | 12/2002 |
| EP | 2703286 | 3/2014 |

OTHER PUBLICATIONS

Accurate Positioning of Spring Returned Pneumatic Artificial Muscle Using Sliding-mode Control, 1st Regional Conference—Mechatronics in Practice and Education MECH—Conf 2011, Sarosi et al., Dec. 2011.*

(Continued)

*Primary Examiner* — Woody Lee, Jr.

(57) ABSTRACT

One example of a rotorcraft blade control system includes a mechanical linkage to connect to a rotorcraft blade including a feather axis and a pneumatic muscle connected to the mechanical linkage. The system also includes a movement member connected to the mechanical linkage, the pneumatic muscle and the movement member to move the mechanical linkage to control movement of the rotorcraft blade on the feather axis. The pneumatic muscle can be a first pneumatic muscle and the movement member can be a second pneumatic muscle or a bias spring.

20 Claims, 7 Drawing Sheets

(56) References Cited

U.S. PATENT DOCUMENTS

2011/0084174 A1* 4/2011 Hemmelgarn ............ B64C 3/48
                                                    244/200
2011/0116927 A1* 5/2011 Hancock ............... F03D 1/0675
                                                    416/23
2011/0266391 A1* 11/2011 Kothera ................. B64C 27/72
                                                    244/99.5

OTHER PUBLICATIONS

Control System Development for Pneumatic Artificial Muscle-Driven Active Rotor Systems, Journal of Guidance, Control, and Dynamics vol. 36, No. 4, Aug. 2013.*
European Search Report issued in EP Application No. 15197659.4 on Mar. 14, 2016, (4 pages).
Communication Pursuant to Article 94(3) EPC issued in European Application No. 15197659.4 on Apr. 7, 2016; 5 pages.
Daerden et al. Pneumatic Artificial Muscles: actuators for robotics and automation, Vrije Universiteit Brussel, Dept. of Mechanical Engineering, 11 pages.
Plattenburg, "Pneumatic Actuators: a Comparison of Energy-to-Mass Ration", Proceedings of the 20005 IEEE, Jun. 28-Jul. 1, 2005, Chicago, IL, paper FrA01-05; 5 pages.
Festo, Fluidic Muscle DMSP/MAS, brochure, Jun. 2008; 34 pages.

* cited by examiner

INDIVIDUAL BLADE CONTROL UTILIZING PNEUMATIC MUSCLES

TECHNICAL FIELD

This disclosure relates to pneumatic muscles, e.g., for independent rotor blade control.

BACKGROUND

Many rotorcraft use systems that allow the rotor blades to pitch or at least partially rotate about an axis. For example, a blade can pitch about a "feather axis" that is parallel to the length of the blade. Feathering (i.e., pitching/rotating about a feather axis) a blade changes the blade's angle of attack, which changes the lift generated by that blade causing the blade to flap or otherwise generate a controlling moment on the hub. Feathering the blade cyclically at the frequency of the rotor speed creates a powerful method by which primary aircraft flight control can be obtained. In some rotorcraft, a swashplate can provide cyclic control of feathering and collective control of feathering of the blades. Some rotorcraft control the feathering of each blade individually. For example, each blade can be coupled to an independently controlled actuator that pitches the blade. Individually controlling each blade can provide more dynamic control of the rotorcraft during flight operation, yielding certain benefits not available with swashplate control.

SUMMARY

This disclosure describes technologies relating to individual blade control utilizing pneumatic muscles.

In some aspects, a rotorcraft blade control system includes a mechanical linkage to connect to a rotorcraft blade including a feather axis, a pneumatic muscle connected to the mechanical linkage, and a movement member connected to the mechanical linkage, the pneumatic muscle and the movement member to move the mechanical linkage to control movement of the rotorcraft blade on the feather axis.

This, and other aspects, can include one or more of the following features. The pneumatic muscle can be a first pneumatic muscle and the movement member can be a second pneumatic muscle. The system can also include a controller connected to the first pneumatic muscle and the second pneumatic muscle, the controller configured to perform operations including actuating at least one of the first pneumatic muscle or the second pneumatic muscle to move the mechanical linkage. The controller can be configured to perform operations including increasing a pressure and decreasing a pressure in the first pneumatic muscle to actuate the first pneumatic muscle. The system can also include a position sensor to connect to the rotorcraft blade to determine a position of the rotorcraft blade. The controller can also be configured to perform operations including receiving a position signal from the position sensor, the position signal indicating a first position of the rotorcraft blade, and actuating the first pneumatic muscle and the second pneumatic muscle to move the mechanical linkage to move the rotorcraft blade from the first position to a second position in response to receiving the position signal. The first pneumatic muscle and the second pneumatic muscle can include a first pair of pneumatic muscles. The system can include a second pair of pneumatic muscles including a third pneumatic muscle connected to the mechanical linkage adjacent the first pneumatic muscle and a fourth pneumatic muscle connected to the mechanical linkage adjacent the second pneumatic muscle, the first pair of pneumatic muscles and the second pair of pneumatic muscles to move the mechanical linkage to control movement of the rotorcraft blade on the feather axis. The first pneumatic muscle can include a first end and a second end, the first end connected to the mechanical linkage, the second end connected to a rotorcraft member, wherein the second end remains stationary relative to the rotorcraft blade pitch displacement and the first end moves to pitch the blade when the first pneumatic muscle moves the mechanical linkage. The second pneumatic muscle can include a third end and a fourth end, the third end connected to the mechanical linkage, the fourth end connected to a rotorcraft member, wherein the fourth end remains stationary relative to the rotorcraft blade pitch displacement and the third end moves to pitch the blade when the second pneumatic muscle moves the mechanical linkage. The first pneumatic muscle or the second pneumatic muscle can be about 12 inches long. The mechanical linkage can include a bell crank. The mechanical linkage can include a first end connected to the rotorcraft blade and a second end connected to a rotorcraft hub. The movement member can be a bias spring.

In some aspects, a rotorcraft blade control system includes a pneumatic muscle to connect to a rotorcraft blade including a feather axis. The system also includes a movement member to connect to the rotorcraft blade and a controller to connect to the rotorcraft blade and the pneumatic muscle, the controller to actuate the pneumatic muscle to control movement of the rotorcraft blade on the feather axis.

This, and other aspects, can include one or more of the following features. The system can also include a mechanical linkage connected to the pneumatic muscle and to the movement member, the mechanical linkage to connect the pneumatic muscle and the movement member to the rotorcraft blade, the controller to actuate the pneumatic muscle to move the mechanical linkage to control movement of the rotorcraft blade on the feather axis. The mechanical linkage can include a bell crank. The pneumatic muscle can be a first pneumatic muscle and the movement member can be a second pneumatic muscle. The controller can be configured to actuate a pair of pneumatic muscles including the first pneumatic muscle and the second pneumatic muscle to control movement of the rotorcraft blade on the feather axis. The pair of pneumatic muscles can be a first pair of pneumatic muscles, and the system can also include a second pair of pneumatic muscles comprising a third pneumatic muscle and a fourth pneumatic muscle, each to connect to the rotorcraft blade. The controller can be connected to the second pair of pneumatic muscles and can be configured to actuate the second pair of the pneumatic muscles to control movement of the rotorcraft blade on the feather axis.

In some aspects, a method of controlling movement of rotorcraft blades includes connecting multiple pairs of pneumatic muscles to multiple rotorcraft blades, each pair of pneumatic muscles connected to a respective rotorcraft blade. The method also includes actuating each pair of pneumatic muscles to independently control movement of each respective rotorcraft blade on a respective rotorcraft blade feather axis.

This, and other aspects, can include one or more of the following features. Connecting a pair of pneumatic muscles to a respective rotorcraft blade can include connecting the pair of pneumatic muscles to a mechanical linkage and connecting the mechanical linkage to the respective rotorcraft blade. Actuating a pair of pneumatic muscles to control movement of a respective rotorcraft blade can include determining a position of the rotorcraft blade on the feather axis, identifying a new position of the rotorcraft blade on the feather axis, and actuating the pair of pneumatic muscles to move the respective rotorcraft blade to the new position.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to an independent rotor blade control that utilizes pneumatic muscles. Individual blade control (IBC) is a rotor control technique that provides independent control of feathering for each blade by coupling an actuator to the blade. An individual actuator on each blade can mechanically decouple blade motion and introduce control of feathering at a frequency greater than the frequency of revolution of the rotor blades. The use of blade control at a frequency greater than the frequency of rotor revolution is sometimes called Higher Harmonic Control (HHC). In some cases, HHC can decrease rotor-generated vibration and rotor noise. In some cases, HHC can increase individual blade efficiency and reduce the power needed to operate the rotor. IBC can also provide adaptive control for specific situations. For example, if one blade is damaged, the remaining blades can be controlled to maximize stability.

One technique for IBC uses an actuator embedded along the length of each blade to control a servo flap. However, this technique can require large flap deflections with associated drag penalties. Furthermore, the size and shape of the servo flap actuator must be constrained to fit within the blade. Another technique for IBC uses an actuator located at the root of each blade to provide feathering control directly to the blade, sometimes called "blade root actuation." Blade root actuation can reduce weight and drag penalties that are associated with the embedded actuator technique. In some rotorcraft, electric actuators or hydraulic actuators are used for blade root actuation. However, electric actuators can have low torque and can include a separate mechanical transmission. Hydraulic actuators can leak hydraulic fluid into the aircraft, despite seals. Fluid leaks and residue on rotor components can pose mass imbalance issues that reduce efficiency. Both electric and hydraulic actuators and their related components can be heavy and thus can increase overall rotor system weight.

This disclosure describes an individual blade control actuator using pneumatic muscles. A pneumatic muscle, also known as a fluid actuator, is a linear actuator that is operated by fluid pressure. Typically, the operational fluid is a gas such as compressed air. A pneumatic muscle includes a closed membrane or tube that has opposite ends attached to mechanical components. For example, one end of the membrane can be attached to the load, and the other end of the membrane can be attached to a fixed component. As the membrane is inflated with gas, it bulges outward and contracts axially, exerting a pulling force on the load. The magnitude of the applied force is a function of the air pressure applied and the muscle stroke. Conversely, as gas is exhausted out of the membrane, the membrane relaxes and the pulling force reduces. In this manner, a pneumatic muscle is a contractile device and can generate motion in only one direction. In some cases, the membrane is covered by a sleeve to protect the membrane and provide tension. For example, the sleeve can be made of netted or braided fibers, and the tension can be specified by the geometry and composition of the fibers.

In some implementations of a pneumatic muscle actuator, a pair of pneumatic muscles is arranged antagonistically. In an antagonistic arrangement, each pneumatic muscle is connected to the load to exert a pulling force in opposite directions. To actuate the load in one direction, an increase in pressure is applied in the first pneumatic muscle of the pair and the pressure is reduced in the second pneumatic muscle of the pair while applying the increased pressure in the first pneumatic muscle. The increased pressure in the first pneumatic muscle causes the first pneumatic muscle to contract, imparting a pulling force on the load. The reduced pressure in the second pneumatic muscle causes the second pneumatic muscle to transition to an extended state. In the extended state, the second pneumatic muscle imparts less pulling force on the load than the first pneumatic muscle. Thus, the load is translated toward the first pneumatic muscle. To translate the load in the opposite direction, an increased pressure is applied to the second pneumatic muscle and pressure reduction is applied to the first pneumatic muscle. Alternately supplying increased and reduced pressure to the pneumatic muscles can thus selectively actuate the load in opposite directions.

The actuator described in this disclosure includes at least one pneumatic muscle coupled to a rotor blade for direct blade root actuation as a full authority IBC system. The IBC system can include a controller, a position sensor and a pneumatic muscle actuator. Pressurized gas can be provided to a proportional servo valve that controls the flow of gas into and out of each muscle actuator. Multiple sets or pairs of pneumatic muscles can be multiplexed to the blade root in parallel to provide additional force or redundancy. As a single pneumatic muscle provides force in only one direction, the pneumatic muscle can be coupled to a movement member such as a bias spring or a second pneumatic muscle to provide an antagonistic force in a second direction. The pneumatic muscles can be coupled to the blade by a mechanical linkage that includes a bell crank, a pulley, or another mechanism. In some implementations, the force exerted by the pneumatic muscle is nonlinear with pressure as the pneumatic muscle contracts. The pneumatic muscle-blade coupling can be configured to compensate for the nonlinearity to provide a more linear or consistent torque to the blade as the pneumatic muscle contracts. For example, the angles, positions, and lengths of the arms of a bell crank coupling can be configured to provide certain torque characteristics.

As pneumatic muscles are largely gas-filled membranes, they can be lighter than other actuator types such as hydraulic actuators or electric actuators, while providing comparable force. Pneumatic muscles also do not require gearing or a transmission, further reducing potential weight. Reduced aircraft weight can lower fuel consumption and increase efficiency.

The actuator described in this disclosure can also be cheaper to manufacture than other actuator types such as hydraulic and electric actuators. Furthermore, pneumatic muscles do not experience a negative stick-slip type friction typical in common pneumatic cylinders caused by a piston seal. Thus, pneumatic muscles can be easier to control in precision servo applications. Pneumatic muscles can be easily replaced and do not leak fluid (liquid) or leave residue. If a leak forms in a pneumatic muscle, the gas simply exhausts to atmosphere. Furthermore, unlike other types of actuators that can require gearing, pneumatic muscles do not jam if the actuator fails. The actuator described here can have a bandwidth of at least 50 Hz, which is suitable for many aircraft applications. For example, the pneumatic muscle IBC described can provide both primary flight control (control at or below the frequency of rotor revolution) and higher harmonic controls (control at a frequency greater than the frequency of rotor revolution).

The pneumatic muscle IBC system described can be implemented as a closed circuit pneumatic system. Closed circuit pneumatic systems can capture exhaust gas and recycle the air used for pneumatic actuation. Closed circuit systems can reuse energy in the compressed gas and also reduce energy losses associated with air drying and filtering. Due to these features, closed circuit systems can have efficiencies approaching 50%.

Figure 1A:
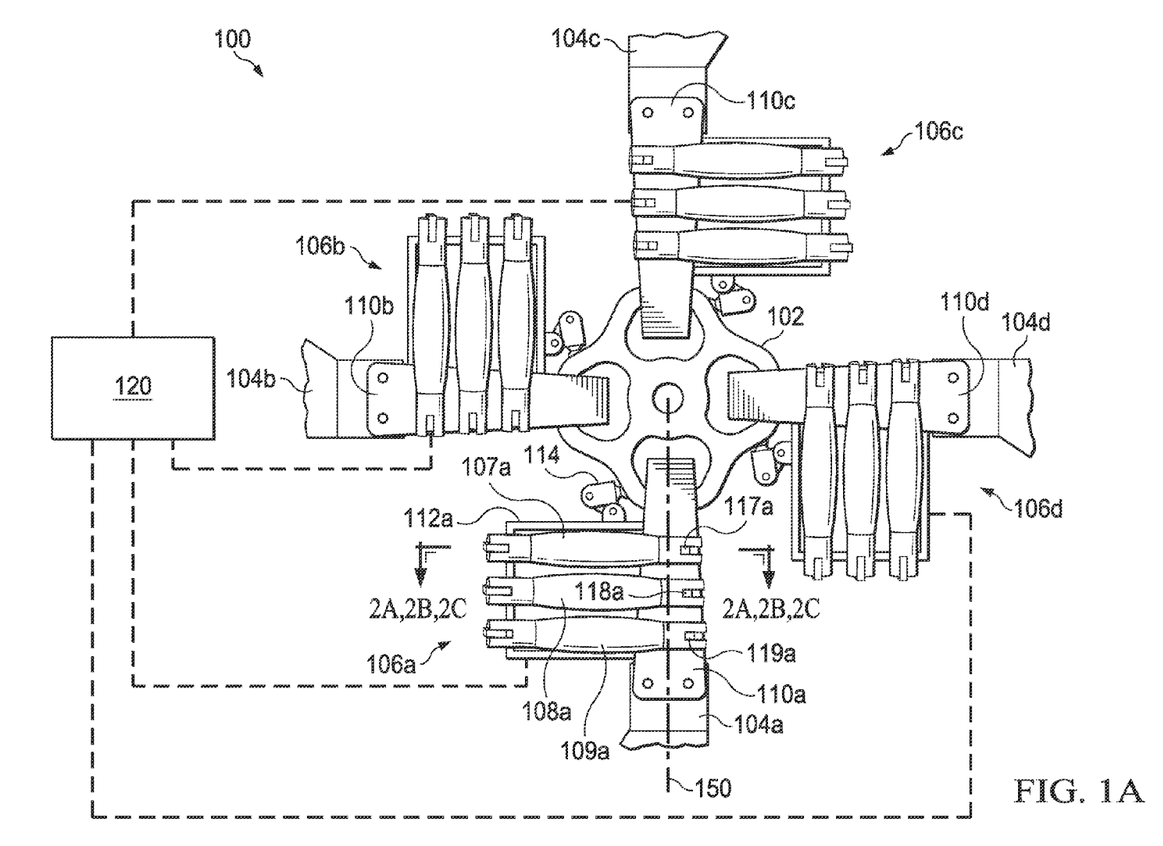
FIGS. 1A-B show schematic diagrams of an example rotor assembly implementing example individual blade control system.
Figure 1B:
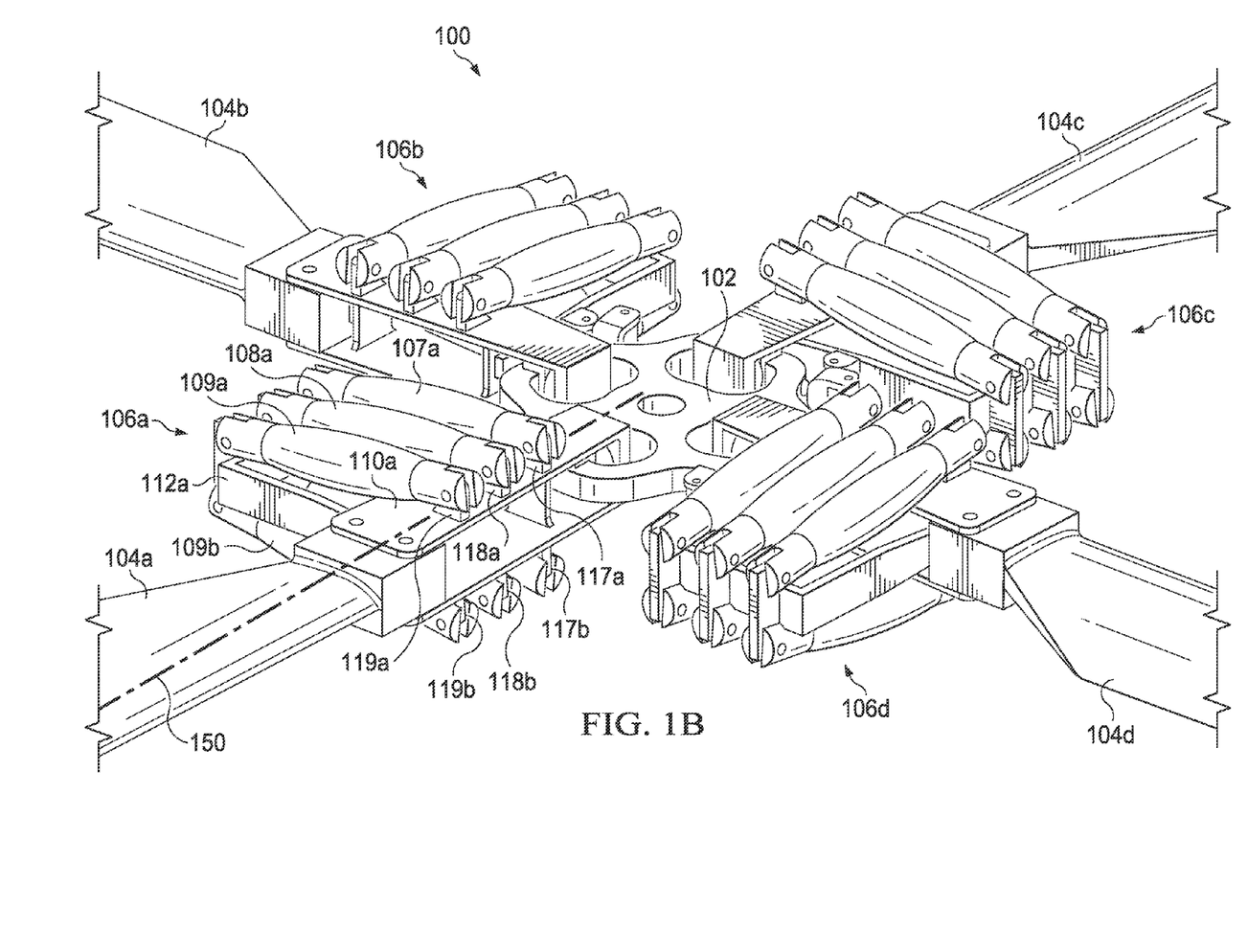

FIGS. 1A-B show schematic diagrams of an example rotor assembly 100 implementing example individual blade control systems ("IBC systems") 106a-d. FIG. 1A is a top-down view, and FIG. 1B is a perspective view. The rotor assembly 100 includes a rotorcraft hub 102 and multiple blades 104a-d that are each rotatably attached to the hub 102 by grips 110a-d, respectively. Rotor assembly 100 includes four blades 104a-d, but other implementations can have more or fewer blades with associated grips, linkages, IBC systems, and other components. The hub 102 can be attached to a mast (not shown) that can rotate the rotor assembly 100. For example, the mast can be a rotorcraft mast, and the blades 104a-d can be the rotor blades of the rotorcraft. Each blade 104a-d is respectively connected to a grip 110a-d. For example, a first end of each grip 110a-d can be respectively connected to a blade 104a-d, and a second end of each grip 110a-d can be connected to the rotorcraft hub 102. Each blade 104a-d can have a feather axis that extends radially from the hub and is substantially parallel to the length of the blade 104a-d. An example feather axis 150 for blade 104a is shown in FIGS. 1A-B. Each blade 104a-d can pitch by moving about its respective feather axis. The connections between each grip 110a-d and the hub 102 can allow movement of each grip 110a-d and its associated blade 104a-d about its associated feather axis. In some implementations, each grip 110a-d can be connected to the hub 102 via one or more rotatable bearings such as centrifugal force bearings, elastomeric bearings, or other types of bearings. In some implementations, the connection between each blade 104a-d and its associated grip 110a-d or the connection between each grip 110a-d and the hub 102 can also allow each blade 104a-d to flap (displace out of the plane of motion) and lag (displace in the plane of motion) relative to the hub 102.

Each blade 104a-d can be rotated about its feather axis by actuation provided by its associated IBC system 106a-d. The example IBC system 106a includes three pairs of pneumatic muscles. A first pair of pneumatic muscles 107 includes a first pneumatic muscle 107a and a second pneumatic muscle 107b. Similarly, a second pair 108 includes pneumatic muscles 108a-b, and a third pair 109 includes pneumatic muscles 109a-b. In other implementations, IBC system 106a can include more or fewer pairs of pneumatic muscles. For example, each IBC system 106a-d can include more than three pneumatic muscle pairs to provide additional force or additional redundancy for safety. In some implementations, the pneumatic muscles 107a-b, 108a-b, 109a-b are connected to the blade 104 such that the muscles are substantially in-plane or parallel with the plane defined by rotation of the blades 104, as shown in FIGS. 1A-B. A parallel pneumatic muscle configuration can reduce drag during rotation of the blades. In some implementations, the pneumatic muscles 107a-b, 108a-b, 109a-b are connected to the blade 104 in a non-parallel configuration, such as perpendicular to the rotation plane or at an angle to the rotation plane. Characteristics of the pneumatic muscles 107a-b, 108a-b, 109a-b can be configured for specific applications. For example, the diameter and length of the pneumatic muscles can determine the force exerted by each muscle, and can be selected to provide a specific force. In some implementations, the pneumatic muscles have a length of about 12 inches, and in some implementations, the pneumatic muscles have another length (e.g., 10 inches, 14 inches, etc.). The pressures of the gas within each pneumatic muscle can also be specified based on the application to affect stiffness and efficiency.

Each pair 107a-b, 108a-b, 109a-b of pneumatic muscles is connected to the grip 110a and a rotorcraft member 112a. For example, a first end of first pneumatic muscle 107a is connected to a first linkage 117a, and a second end of first pneumatic muscle 107a is connected to rotorcraft member 112a. A first end of second pneumatic muscle 107b is connected to a second linkage 117b, and a second end of second pneumatic muscle 107b is connected to the rotorcraft member 112a. In some implementations, the pneumatic muscles 107a-b are connected to the grip 110a or the blade 104a via linkages 117a-b. Other pairs of pneumatic muscles (e.g., pneumatic muscle pairs 108a-b, 109a-b in the IBC system 106a) can be similarly connected to other corresponding linkages (e.g., linkages 118a-b, 119a-b), rotorcraft members, grips, blades, and other components. The rotorcraft member 112a is connected to the hub 102 and remains stationary relative to the blade 104a as the blade 104a moves about its feather axis 150. In some implementations, the rotorcraft member 112a is connected to the hub 102 by one or more joints 114a. The joint 114a can react the torque from the pneumatic muscle pairs 107, 108, 109 to the hub 102. Joint 114a can include one or more moveable joints, such as spherical joints, cylindrical joints, linkages, or other types of joints. In some implementations, joint 114a is configured to allow the blade 104a, rotorcraft member 112a, and the grip 110a to flap, lag, and pitch relative to the hub 102 while providing a fixed attachment for the muscles that can also flap and lag, but resist pitching forces. The IBC systems 106b-d can be substantially similar to IBC system 106a and have similar corresponding components.

The example rotor assembly 100 also includes a controller 120 connected to each IBC system 106a-d. The controller 120 can control movement of a blade on the feather axis by controlling actuation of each IBC system 106a-d by controlling the respective pressures in the pneumatic muscles 107a-b, 108a-b, 109a-b. For example, the controller 120 can control a valve that provides increased and reduced pressures to the pneumatic muscles 107a-b, 108a-b, 109a-b. In some implementations, more than one controller 120 is included in the rotor assembly 100. In some implementations, the controller 120 controls the pneumatic muscles 107a-b, 108a-b, 109a-b in response to receiving a signal from another system. For example, the controller can receive a signal from a position sensor or other sensor, a flight control computer, the avionics system on an aircraft, or another system. In some implementations, the controller 120 is included as part of another system, such as a computer system or other data processing apparatus. For example, the controller 120 can be incorporated as part of a flight control computer, the avionics system on an aircraft, or another system.

Figure 2A:
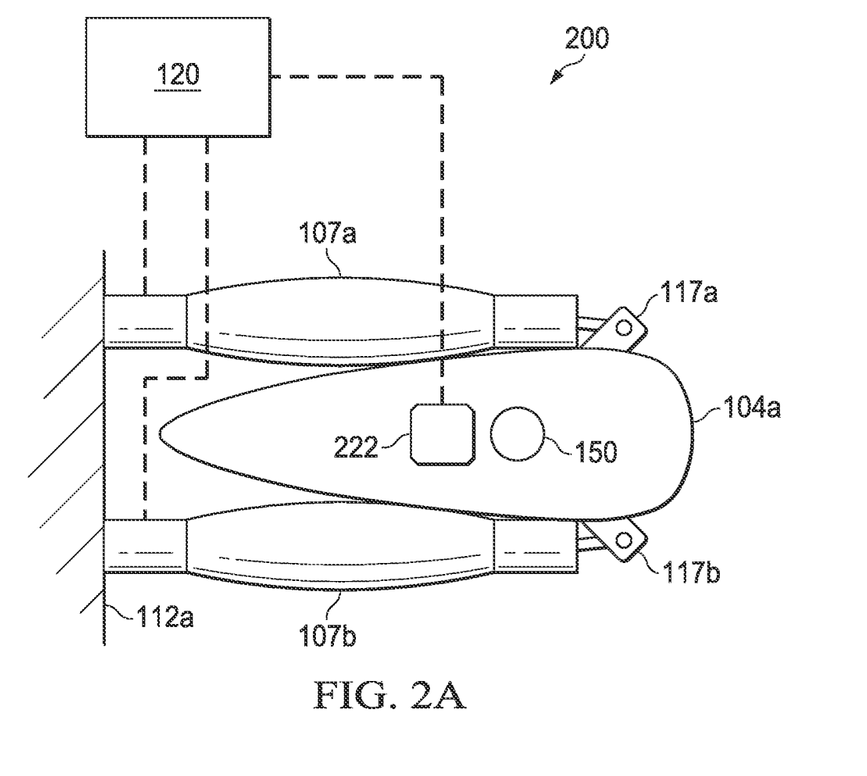
FIGS. 2A-C show a schematic cross-sectional diagram of an implementation of an example individual blade control system.
Figure 2B:
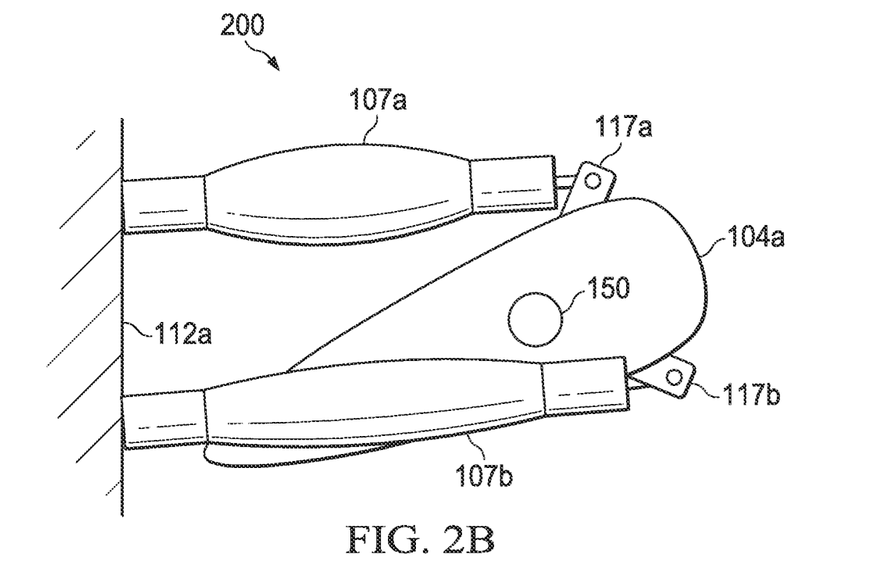
Figure 2C:
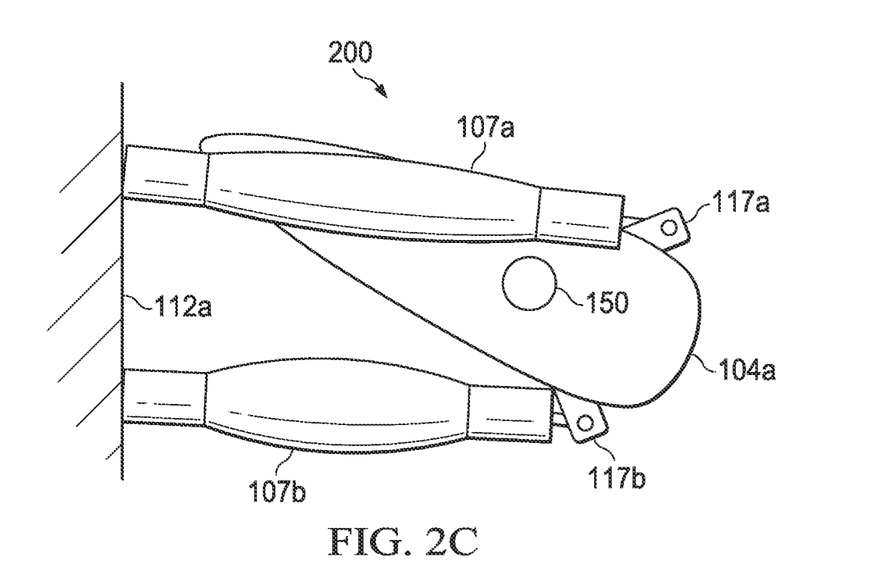

FIGS. 2A-C show a schematic cross-sectional diagram of an implementation of an example IBC system 200. The IBC system 200 can be implemented, for example, in a rotorcraft assembly such as rotorcraft assembly 100. The example IBC system 200 actuates blade 104a about feather axis 150. The IBC system 200 includes a pair of pneumatic muscles 107a-b. In example IBC system 200, second pneumatic muscle 107b is the movement member that provides a force to oppose first pneumatic muscle 107a. In other implementations, the movement member is a bias spring that provides a return force on the blade 104a opposite that of the first pneumatic muscle 107a. In the example IBC system 200, each example linkage 117a-b is a bell crank. The linkages 117a-b can have different lengths, sizes, or locations. In other implementations, one or both linkages 117a-b can be a pulley, a hinge, a joint, or another type of linkage.

The IBC system 200 also include a controller 120 connected to the pneumatic muscles 107a-b. The controller 120 controls the respective pressures in the pneumatic muscles 107a-b to move the mechanical linkages 117a-b to control movement of the rotorcraft blade 104a on the feather axis 150. For example, the controller 120 can alternately apply an increased pressure or a reduced pressure to one or both pneumatic muscles 107a-b. The controller 120 can vary the pressures at a frequency of between at least 5 Hz and up to 100 Hz. The controller 120 can also be connected to a position sensor 222. The position sensor 222 can transmit to the controller 120 a position signal that indicates a position of the blade 104a. For example, the position sensor 222 can be connected to the rotorcraft blade 104a to determine a position of the rotorcraft blade 104a. In some implementations, the position sensor 222 determines the angle that the blade 104a is rotated. In IBC system 200, the position sensor 222 is located in the blade 104a, but in other implementations, the position sensor 222 can be located on pneumatic muscle 107a, 107b, on linkage 117a, 117b, or in another location. In some implementations, two or more position sensors are used, for example, to provide redundancy.

The first pneumatic muscle 107a and the second pneumatic muscle 107b are connected to the blade 104a antagonistically, in that each pneumatic muscle 107a, 107b generates force to rotate the blade 104a in an opposite direction. In this manner, the blade 104a can be rotated in opposite directions by selectively pressurizing each pneumatic muscle 107a, 107b. In some implementations, the pneumatic muscles 107a-b are arranged at a different angle than shown or at different locations than shown.

FIG. 2A shows the IBC system 200 with the pair of pneumatic muscles 107a-b in an equally pressurized state. In some implementations, an equally pressurized state can represent a "default" or "unrotated" state of the blade 104a. In some cases, both pneumatic muscles 107a-b are pressurized to specific respective pressures prior to actuation. In some implementations, more than one pair of pneumatic muscles can be used. For example, two (or more) pneumatic muscles can be arranged adjacently and in parallel to actuate the blade in one direction, and two (or more) pneumatic muscles can be arranged adjacently and in parallel to actuate the blade in another direction. In this manner, additional force can be applied to the blade by using multiple pairs of pneumatic muscles. Additionally, should one pneumatic muscle fail, the other pneumatic muscles can still maintain operation of the IBC system. In such implementations, the controller 120 can be connected to the second pair of pneumatic muscles and be configured to actuate the second pair of the pneumatic muscles to control movement of the rotorcraft blade 104a on the feather axis 150.

FIG. 2B shows a schematic diagram of IBC system 200 in which the controller 120 has applied an increased pressure in the first pneumatic muscle 107a and a reduced pressure in the second pneumatic muscle 107b. The first pneumatic muscle 107a contracts under the increased pressure and pulls the linkage 117a which in turn rotates the blade 104a in a first direction, as shown in FIG. 2B. The second pneumatic muscle 107b transitions to an extended state under reduced pressure and allows the first pneumatic muscle 107a to pull the linkage 117a.

FIG. 2C shows the IBC system 200 in which the blade 104a has been rotated in a second direction that is opposite to the first direction. To actuate as shown in FIG. 2C, the controller applies a decreased pressure in the first pneumatic muscle 107a and an increased pressure in the second pneumatic muscle 107b. The second pneumatic muscle 107b contracts under the applied increased pressure and pulls the linkage 117b and the blade 104a, as shown in FIG. 2C. Under reduced pressure, the first pneumatic muscle 107a transitions to an extended state and allows the second pneumatic muscle 107b to pull the linkage 117b.

Figure 3:
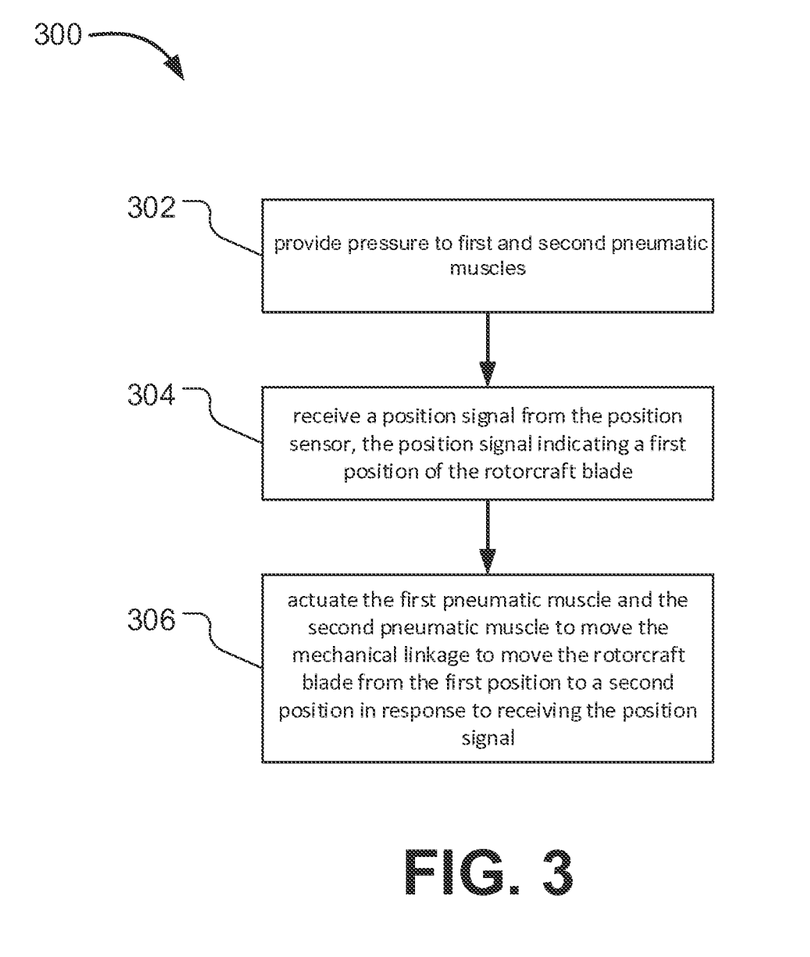
FIG. 3 shows a flowchart of an example actuation process that can be implemented by the example individual blade control systems.

FIG. 3 shows a flowchart of an example actuation process 300 that can be implemented by example rotor assembly 100 or example IBC system 200. In the actuation process 300, the movement member is a second pneumatic muscle. However, a similar process can be implemented for a rotor assembly or an IBC system using a movement member that is not a second pneumatic muscle. At 302, gas pressure is provided to the first and second pneumatic muscles. For example, the pressure can be provided by a gas source such as an air compressor or other source. The gas pressure can be provided through one or more valves that are controlled by one or more controllers. At 304, a position signal is received from the position sensor, the position signal indicating a first position of the rotorcraft blade. For example, the position signal can be received by a controller included in the IBC system or connected to the IBC system.

At 306, in response to receiving the position signal, the first and second pneumatic muscles are actuated to move the mechanical linkage to move the rotorcraft blade. To actuate the pneumatic muscles, a pressure in each pneumatic muscle is varied between an increased pressure and a reduced pressure to move the linkage connected to the blade. For example, a controller can control a valve to alternately supply an increased pressure and a reduced pressure to the pneumatic muscles, as described previously. The second position can be identified, and the controller can apply pressures to the pneumatic muscles to move the blade from the first position to the second position. For example, the first position can be a first angle of blade orientation, and the second position can be a second angle of blade orientation. The second position can be identified by the controller, a computing system, a flight control system, or another system. In some implementations, the process 300 returns to 304, and in this manner, the position of the blade is repeatedly determined by the position sensor, and the blade is repeatedly moved to a new position.

Figure 4:
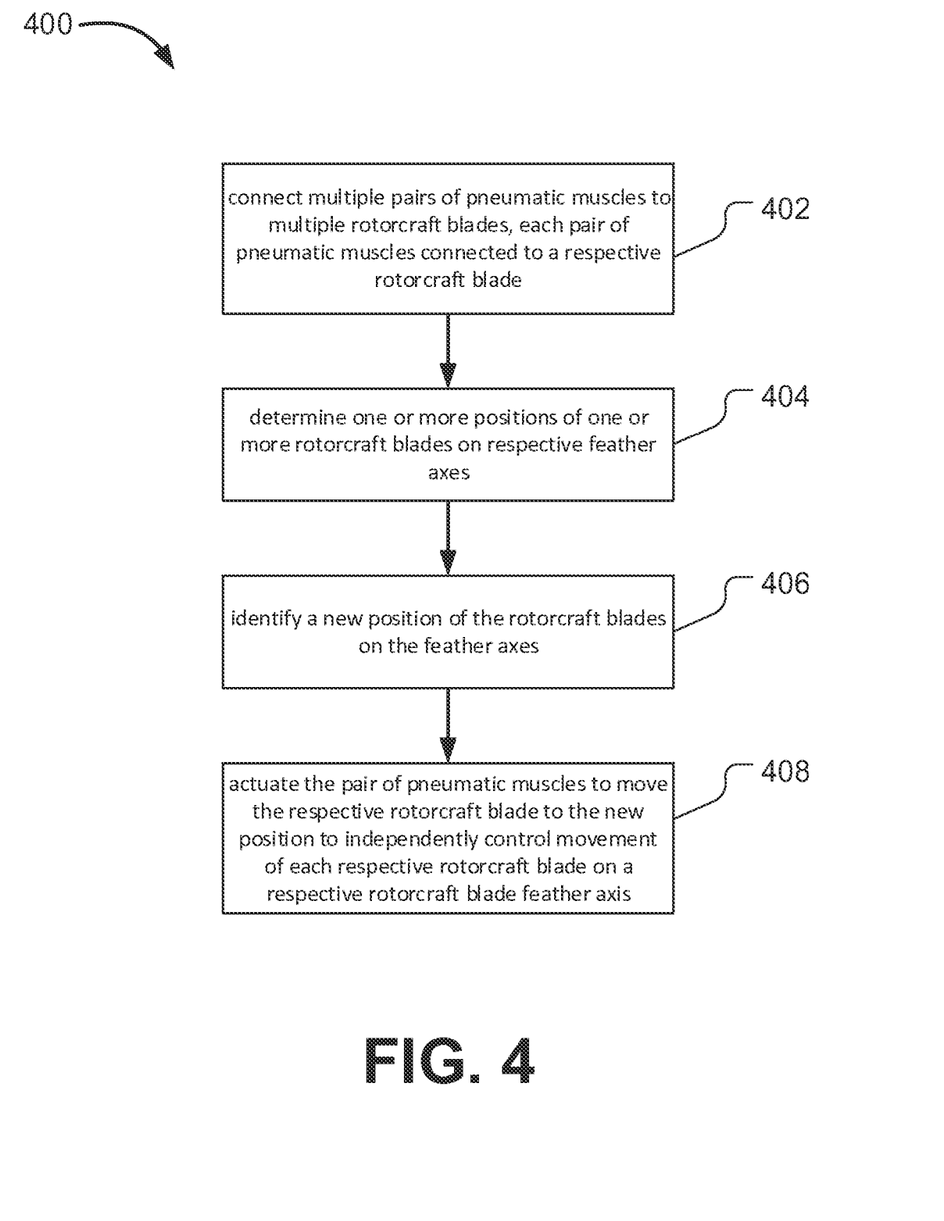
FIG. 4 shows a flowchart of a second example actuation process that can be implemented by the example individual blade control systems.

FIG. 4 shows a flowchart of an example actuation process 400 that can be implemented by example rotor assembly 100 or include example IBC system 200. At 402, multiple pairs of pneumatic muscles are connected to respective multiple rotorcraft blades. For example, each pair of pneumatic muscles can include two pneumatic muscles arranged antagonistically as described previously. Each pair of pneumatic muscles can be part of a respective IBC system. In some implementations, more than one pair of pneumatic muscles are connected to each respective rotorcraft blade. Each pair of pneumatic muscles can be connected to a mechanical linkage, and each mechanical linkage can be connected to the respective rotorcraft blade.

At 404, the positions of one or more of the rotorcraft blades are determined on each blade's respective feather axis. For example, each blade can have a position sensor that determines the position of that blade. At 406, new positions on the feather axes can be identified for one or more of the rotorcraft blades.

At 408, each pair of pneumatic muscles are actuated to move each respective rotorcraft blade on its feather axis to the new position. As each blade can have a respective IBC system, the movement of each blade can be independently controlled. In some implementations, after 408, process 400 can return to 404. In this manner, the positions and feathering movement of multiple rotorcraft blades can be independently controlled to dynamically respond to conditions during operation. For example, the blades can be independently controlled to introduce Higher Harmonic Control.

Figure 5:
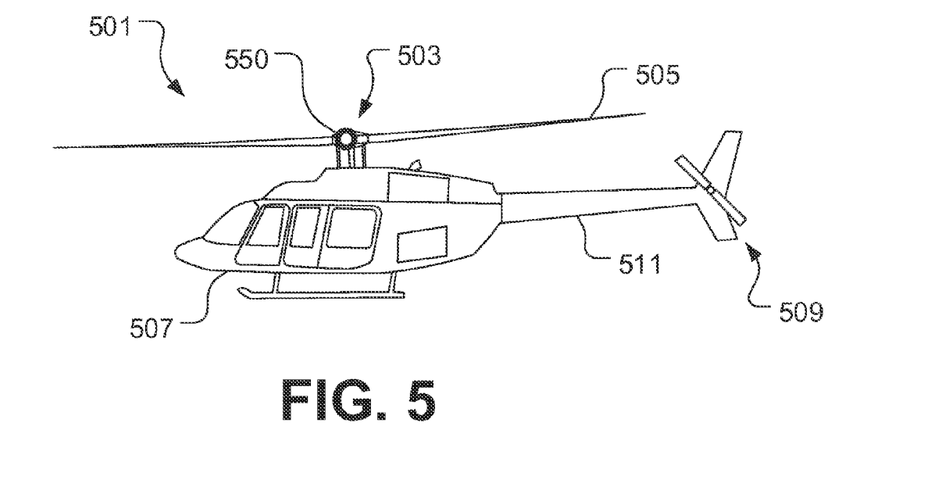
FIG. 5 is a schematic diagram showing an example of a rotorcraft.

The example rotor assembly 100 and the example IBC system 200 can be used to implement individual blade control in an aircraft. As an example, FIG. 5 shows a schematic diagram of an example rotorcraft 501. Rotorcraft 501 has a rotor system 503 with multiple rotor blades 505. Rotorcraft 501 can further include a fuselage 507, anti-torque system 509, and an empennage 511. The rotor assembly 100 and/or IBC system 200 can be included in the rotor system 503, for example, at location 550.

Figure 6:
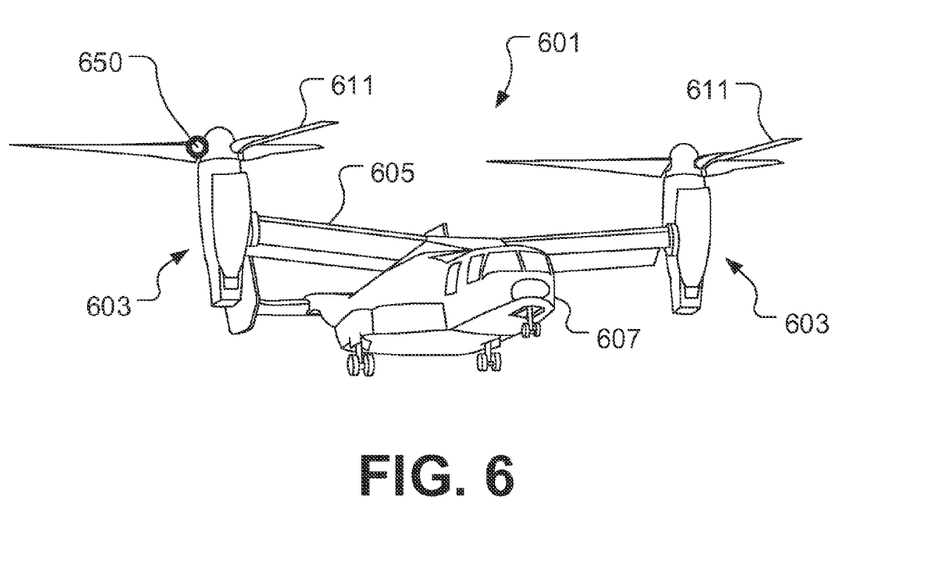
FIG. 6 is a schematic diagram showing an example of a tiltrotor aircraft.

As another example aircraft, FIG. 6 shows a schematic diagram of an example tiltrotor aircraft 601. Aircraft 601 includes a fuselage 607 with attached wings 605. Nacelles 603 are carried at the outboard ends of wings 605 and are rotatable between the helicopter-mode position shown and a forward-facing airplane-mode position (not shown). Nacelles 603 carry engines and transmissions for powering rotor systems 611 in rotation. An engine may be an internal combustion engine, an electrical power source and associated motor, or any other suitable technique for powering rotor system 611. The rotor assembly 100 and/or IBC system 200 can be included in the rotor system of the tiltrotor 601, for example, at location 650.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A rotorcraft blade control system comprising:
  a mechanical linkage to connect to a rotorcraft blade comprising a feather axis;
  a pneumatic muscle having a first end connected to the mechanical linkage and a second end to connect to a rotorcraft member such that the pneumatic muscle and the rotorcraft member are external to the rotorcraft blade and the pneumatic muscle is not parallel to the feather axis; and
  a movement member having a third end connected to the mechanical linkage and a fourth end to connect to the rotorcraft member such that the movement member is external to the rotorcraft blade, the movement member is not parallel to the feather axis, the feather axis extends between the movement member and the pneumatic muscle, and the pneumatic muscle and the movement member are operable to move the mechanical linkage to control movement of the rotorcraft blade on the feather axis.

2. The system of claim 1, wherein the pneumatic muscle is a first pneumatic muscle and wherein the movement member is a second pneumatic muscle.

3. The system of claim 2, further comprising a controller connected to the first pneumatic muscle and the second pneumatic muscle, the controller configured to perform operations comprising actuating at least one of the first pneumatic muscle or the second pneumatic muscle to move the mechanical linkage.

4. The system of claim 3, wherein the controller is configured to perform operations comprising increasing a pressure and decreasing a pressure in the first pneumatic muscle to actuate the first pneumatic muscle.

5. The system of claim 3, further comprising a position sensor to connect to the rotorcraft blade to determine a position of the rotorcraft blade, and wherein the controller is configured to perform operations comprising:
  receiving a position signal from the position sensor, the position signal indicating a first position of the rotorcraft blade; and
  actuating the first pneumatic muscle and the second pneumatic muscle to move the mechanical linkage to move the rotorcraft blade from the first position to a second position in response to receiving the position signal.

6. The system of claim 2, wherein the first pneumatic muscle and the second pneumatic muscle comprise a first pair of pneumatic muscles, and wherein the system comprises a second pair of pneumatic muscles comprising:
  a third pneumatic muscle having a first end connected to the mechanical linkage adjacent the first pneumatic muscle and a second end to connect to the rotorcraft member such that the third pneumatic muscle is external to the rotorcraft blade and the third pneumatic muscle is not parallel to the feather axis; and
  a fourth pneumatic muscle having a third end connected to the mechanical linkage adjacent the second pneumatic muscle and a fourth end to connect to the rotorcraft member, such that the fourth pneumatic muscle is external to the rotorcraft blade, the fourth pneumatic muscle is not parallel to the feature axis, the feather axis extends between the third pneumatic muscle and the fourth pneumatic muscle, and the first pair of pneumatic muscles and the second pair of pneumatic muscles are operable to move the mechanical linkage to control movement of the rotorcraft blade on the feather axis.

7. The system of claim 2, wherein the second end of the first pneumatic muscle remains stationary relative to the rotorcraft blade pitch displacement and the first end of the first pneumatic muscle moves to pitch the rotorcraft blade when the first pneumatic muscle moves the mechanical linkage.

8. The system of claim 2, wherein the fourth end of the second pneumatic muscle remains stationary relative to the rotorcraft blade pitch displacement and the third end of the second pneumatic muscle moves to pitch the rotorcraft blade when the second pneumatic muscle moves the mechanical linkage.

9. The system of claim 2, wherein the first pneumatic muscle or the second pneumatic muscle is about 12 inches long.

10. The system of claim 1, wherein the mechanical linkage comprises a bell crank.

11. The system of claim 1, wherein the mechanical linkage comprises a grip having a first end connected to the rotorcraft blade and a second end connected to a rotorcraft hub.

12. The system of claim 1, wherein the movement member is a bias spring.

13. A rotorcraft blade control system comprising:
a mechanical linkage connected to a rotorcraft blade having a feather axis;
a rotorcraft member that is external to the rotorcraft blade;
a pneumatic muscle having a first end connected to the mechanical linkage and a second end connected to the rotorcraft member such that the pneumatic muscle is external to the rotorcraft blade and not parallel to the feather axis;
a movement member having a third end connected to the mechanical linkage and a fourth end connected to the rotorcraft member such that the movement member is external to the rotorcraft blade, the movement member is not parallel to the feather axis, and the feather axis extends between the movement member and the pneumatic muscle; and
a controller to connect to the rotorcraft blade and the pneumatic muscle, the controller to actuate the pneumatic muscle to control movement of the rotorcraft blade on the feather axis.

14. The system of claim 13, wherein the mechanical linkage comprise a grip having a first end connected to the rotorcraft blade and a second end connected to a rotorcraft hub.

15. The system of claim 13, wherein the mechanical linkage comprises a bell crank.

16. The system of claim 13, wherein the pneumatic muscle is a first pneumatic muscle and the movement member is a second pneumatic muscle, and wherein the controller is configured to actuate a pair of pneumatic muscles comprising the first pneumatic muscle and the second pneumatic muscle to control movement of the rotorcraft blade on the feather axis.

17. The system of claim 16, wherein the pair of pneumatic muscles is a first pair of pneumatic muscles, and wherein the system further comprises a second pair of pneumatic muscles comprising:
a third pneumatic muscle having a first end connected to the mechanical linkage adjacent the first pneumatic muscle and a second end connected to the rotorcraft member such that the third pneumatic muscle is external to the rotorcraft blade and the third pneumatic muscle is not parallel to the feather axis;
a fourth pneumatic muscle having a first end connected to the mechanical linkage adjacent the second pneumatic muscle and a second end connected to the rotorcraft member such that the fourth pneumatic muscle is external to the rotorcraft blade, the fourth pneumatic muscle is not parallel to the feather axis and the feather axis extends between the third pneumatic muscle and the fourth pneumatic muscle; and
wherein the controller is connected to the second pair of pneumatic muscles and is configured to actuate the second pair of the pneumatic muscles to control movement of the rotorcraft blade on the feather axis.

18. A method of controlling movement of rotorcraft blades, the method comprising:
connecting a rotorcraft blade control system to a plurality of rotorcraft blades, wherein the rotorcraft blade control system comprises:
a mechanical linkage connected to the respective rotorcraft blade having a feather axis,
a rotorcraft member that is external to the respective rotorcraft blade,
a pneumatic muscle having a first end connected to the mechanical linkage and a second end connected to the rotorcraft member such that the pneumatic muscle is external to the respective rotorcraft blade and not parallel to the respective feather axis,
a movement member having a third end connected to the mechanical linkage and a fourth end connected to the rotorcraft member such that the movement member is external to the respective rotorcraft blade, the movement member is not parallel to the respective feather axis, and the respective feather axis extends between the movement member and the pneumatic muscle, and
a controller connected to the rotorcraft blades and the pneumatic muscles; and
actuating the pneumatic muscles using the controller to independently control movement of each respective rotorcraft blade on the respective feather axis.

19. The method of claim 18, wherein:
the pneumatic muscle is a first pneumatic muscle, the movement member is a second pneumatic muscle, and the first and second pneumatic muscles comprise a first pair of pneumatic muscles to the respective rotorcraft blade;
and
the rotorcraft blade control system further comprises a second pair of pneumatic muscles connected to the respective rotorcraft blade comprising:
a third pneumatic muscle having a first end connected to the mechanical linkage adjacent the first pneumatic muscle and a second end connected to the rotorcraft member such that the third pneumatic muscle is external to the respective rotorcraft blade and the third pneumatic muscle is not parallel to the respective feather axis, and
a fourth pneumatic muscle having a first end connected to the mechanical linkage adjacent the second pneumatic muscle and a second end connected to the rotorcraft member such that the fourth pneumatic muscle is external to the respective rotorcraft blade, the fourth pneumatic muscle is not parallel to the respective feather axis and the respective feather axis extends between the third pneumatic muscle and the fourth pneumatic muscle.

20. The method of claim 18, wherein actuating the pneumatic muscles using the controller to independently control movement of each respective rotorcraft blade comprises:
  determining a position of the respective rotorcraft blade on the respective feather axis using a position sensor connected to the respective rotorcraft blade and the controller;
  identifying a new position of the respective rotorcraft blade on the respective feather axis; and
  actuating the respective pneumatic muscles to move the respective rotorcraft blade to the new position.

\* \* \* \* \*